US008432331B2

(12) United States Patent
Schilling

(10) Patent No.: US 8,432,331 B2
(45) Date of Patent: Apr. 30, 2013

(54) PERSONAL PORTABLE COMMUNICATION DEVICES WITH DEPLOYABLE DISPLAY SYSTEMS FOR THREE DIMENSIONAL VISUAL REPRESENTATIONS AND/OR PRIVACY AND METHODS OF USE

(75) Inventor: Donald L. Schilling, Palm Beach Gardens, FL (US)

(73) Assignee: Linex Technologies, Inc., West Palm Beach, FL (US)

( * ) Notice: Subject to any disclaimer, the term of this patent is extended or adjusted under 35 U.S.C. 154(b) by 0 days.

(21) Appl. No.: 13/431,608

(22) Filed: Mar. 27, 2012

(65) Prior Publication Data

US 2012/0182295 A1    Jul. 19, 2012

Related U.S. Application Data

(63) Continuation of application No. 12/151,274, filed on May 5, 2008.

(51) Int. Cl.
*G09G 5/00* (2006.01)

(52) U.S. Cl.
USPC ............................ 345/1.3; 345/1.1; 345/905

(58) Field of Classification Search ............... 345/1.1–6, 345/32, 76–104, 204–215, 690–699, 905; 361/600–837; 362/632–632; 348/42–60; 349/15; 353/57–65; 359/462–477
See application file for complete search history.

(56) References Cited

U.S. PATENT DOCUMENTS

| | | | | |
|---|---|---|---|---|
| 5,790,371 A * | 8/1998 | Latocha et al. | .......... | 361/679.32 |
| 5,825,340 A * | 10/1998 | Torizuka et al. | .................. | 345/8 |
| 6,034,717 A * | 3/2000 | Dentinger et al. | ............. | 348/51 |
| 6,069,593 A * | 5/2000 | Lebby et al. | .................... | 345/1.1 |
| 6,327,008 B1 * | 12/2001 | Fujiyoshi | ...................... | 349/106 |
| 6,515,662 B1 * | 2/2003 | Garland | ....................... | 345/427 |
| 6,532,146 B1 * | 3/2003 | Duquette | ................. | 361/679.04 |
| 6,628,244 B1 * | 9/2003 | Hirosawa et al. | .............. | 345/2.3 |
| 6,643,124 B1 * | 11/2003 | Wilk | ........................ | 361/679.04 |
| 6,819,304 B2 * | 11/2004 | Branson | ........................ | 345/1.3 |
| 6,859,219 B1 * | 2/2005 | Sall | ..................... | 345/1.1 |
| 7,039,254 B1 * | 5/2006 | Maenaka et al. | .............. | 382/300 |
| 7,091,926 B2 * | 8/2006 | Kulas | .............. | 345/1.1 |
| 7,484,847 B2 * | 2/2009 | Fuziak, Jr. | ..................... | 351/158 |
| 7,782,274 B2 * | 8/2010 | Manning | ........................ | 345/1.3 |
| 2002/0135535 A1 * | 9/2002 | Muller | ........................ | 345/1.1 |
| 2004/0113908 A1 * | 6/2004 | Galanes et al. | ............... | 345/418 |
| 2004/0135740 A1 * | 7/2004 | Sato et al. | ......................... | 345/6 |
| 2005/0088463 A1 * | 4/2005 | Schilling | ....................... | 345/699 |
| 2005/0099361 A1 * | 5/2005 | Majer | ...................... | 345/1.3 |
| 2005/0134524 A1 * | 6/2005 | Parker et al. | ..................... | 345/1.1 |
| 2005/0168814 A1 * | 8/2005 | Tomisawa et al. | ............. | 359/462 |
| 2005/0185276 A1 * | 8/2005 | Tomisawa et al. | ............. | 359/472 |
| 2005/0248501 A1 * | 11/2005 | Kim | ........................ | 345/1.1 |
| 2007/0126691 A1 * | 6/2007 | Lin et al. | ........................ | 345/102 |
| 2007/0268271 A1 * | 11/2007 | Kinjo | ............................. | 345/173 |
| 2008/0068288 A1 * | 3/2008 | Henkel | ........................ | 345/1.3 |
| 2009/0059364 A1 * | 3/2009 | Brown et al. | .................. | 359/421 |
| 2011/0234771 A1 * | 9/2011 | Kim et al. | ........................ | 348/53 |

\* cited by examiner

*Primary Examiner* — Alexander Eisen
*Assistant Examiner* — Patrick F Marinelli

(57) ABSTRACT

A personal portable communication device includes a deployable display system movable from a stored position to an extended position for use in three-dimensional representations of display data and/or privacy in viewing display data.

18 Claims, 21 Drawing Sheets

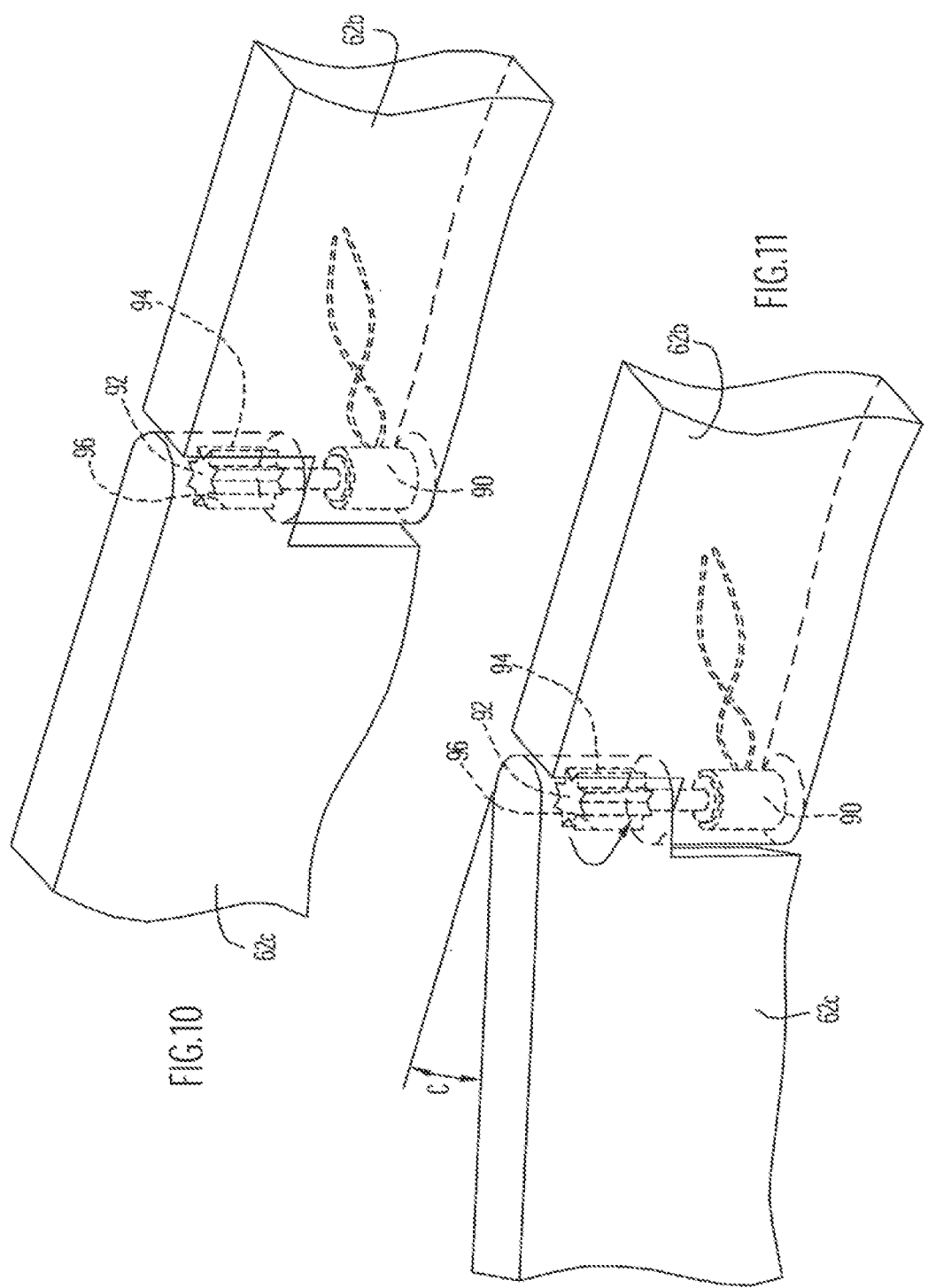

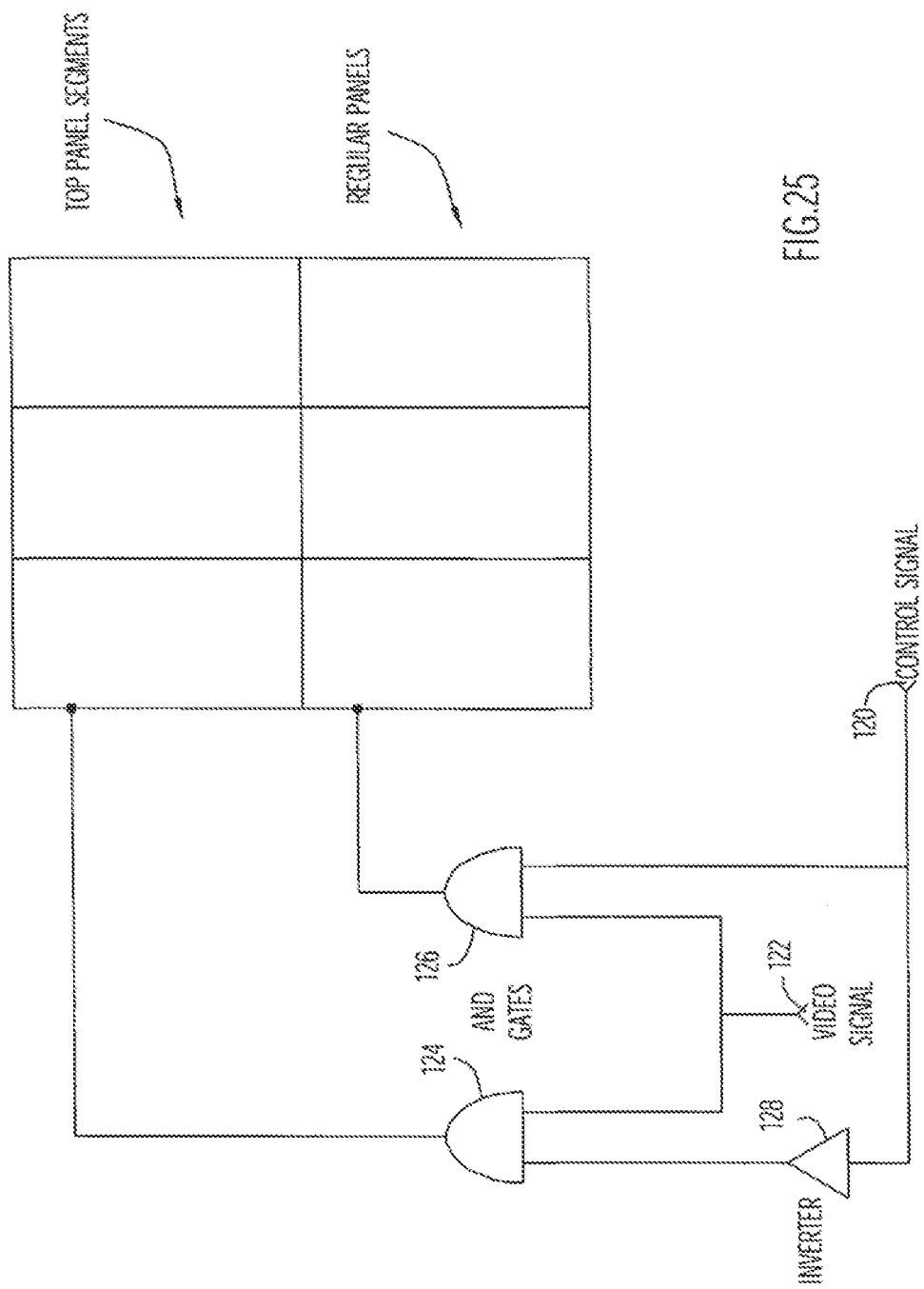

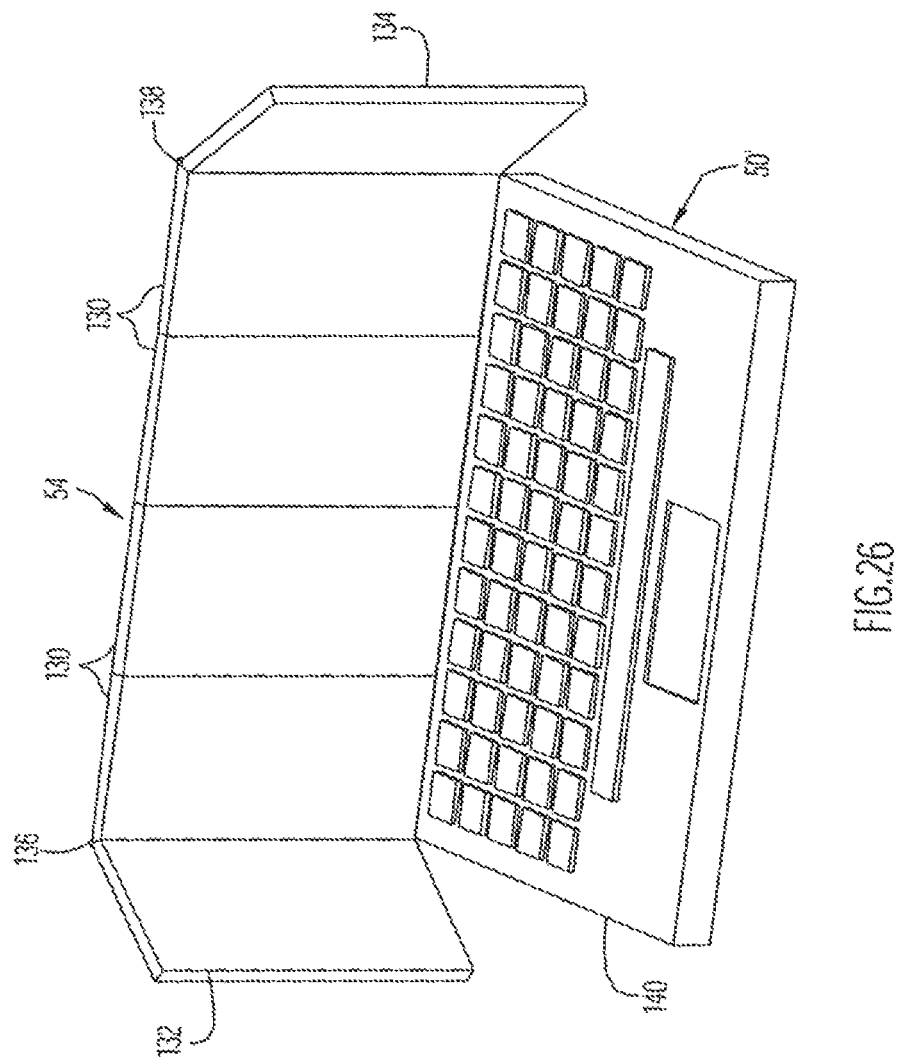

PERSONAL PORTABLE COMMUNICATION DEVICES WITH DEPLOYABLE DISPLAY SYSTEMS FOR THREE DIMENSIONAL VISUAL REPRESENTATIONS AND/OR PRIVACY AND METHODS OF USE

CROSS-REFERENCE TO RELATED PATENT APPLICATION

The subject patent application is a continuation of U.S. patent application Ser. No. 12/151,274 filed May 5, 2008, the entire disclosure of which is incorporated herein by reference.

BACKGROUND OF THE INVENTION

1. Field of the Invention

The present invention relates to communication devices and methods and, more particularly, to personal portable communication devices and methods of use thereof.

2. Brief Discussion of the Related Art

In communications systems used today, the display system utilized in personal portable communication devices is primarily planar. Accordingly, people around the user of the personal portable communication device can easily view the display data such that the user does not have privacy. Additionally, the display data is essentially only available in a two-dimensional mode (2D) due to the planar nature of the display system. Prior art attempts to provide three-dimensional (3D) displays have been extremely complicated and expensive. U.S. Pat. No. 5,132,839 to Travis and Published U.S. Patent Application No. 2006/0176557 to Travis are exemplary of attempts to provide 3D display systems as is a television system developed by Phillips Electronics which employed lenticular lenses. The above prior art utilizes planar display systems, thus adding to the complexity thereof.

U.S. Pat. No. 6,819,304 to Branson and U.S. Pat. No. 6,859,219 to Saul are exemplary of systems for adjusting the screen size on a computer, the displays on the screens being planar and not being useful for either 3D displays or for providing privacy.

Stereoscopic viewing is a fundamental technique used to achieve a 3D picture by two different views being placed in a special set of eyeglasses so that the left eye sees one view while the right eye sees the other view. The result, if the user has similar sight in each eye, is a 3D picture. The basic concept is that a person's brain combines the two images as it normally does when any scene or object is viewed to produce the 3D image. In the past, such systems required special glasses or, as in the case of the Phillips TV technique, required elaborate and complicated lens systems.

SUMMARY OF THE INVENTION

The present invention utilizes a display system in a personal portable communication device where an imaging screen created by a display system has a retracted position and an extended position to permit 3D viewing of display data and/or to provide privacy from individuals near the screen.

In one aspect, the present invention utilizes a display system with a personal portable communication device where the display system is formed of a plurality of display panels having a stored position and an expanded deployed position to form a single visual representation of display data.

In another aspect, a 3D visual representation of display data is provided on a personal portable communication device by supplying electronic image signals from first and second cameras to left and right screens created by a display system for visualizing the display data primarily by the left and right eyes of a user, respectively.

A further aspect of the present invention is to present a 3D visual representation of display data utilizing electronic image signals of display data in odd and even fields such that visualizing the display data on left and right screens simultaneously produces a 3D image of the display data.

In a further aspect, a personal portable communication device has left and right screens each of which have an arcuate portion with a center of curvature at the left and right eyes of a user of the personal portable communication device.

In yet another aspect, the present invention relates to a personal portable communication device including a display system having first and second screens extending laterally from left and right sides of a housing for the personal portable communication device to form privacy portions such that the privacy portions allow full viewing of display data by the user while obstructing viewing by others.

In an additional aspect, a display system for a personal portable communication device has inner and outer hinged panels movable from a retracted position to an extended, angled position where the pixels carried by both the inner and outer panels combine to form a single visual display of display data.

Another aspect of the present invention is the incorporation of a display system in a personal portable communication device where the display system is extendible from left and right sides of a housing for the personal portable communication device for viewing display data and retractable to a position within the perimeter of the housing for storage.

These and other aspects of the present invention will become apparent upon consideration of the following detailed description of preferred embodiments thereof, particularly when taken in conjunction with the accompanying drawings, wherein like reference numerals in the various figures are utilized to designate like or similar components.

BRIEF DESCRIPTION OF THE DRAWINGS

FIGS. 10 and 11 are partial perspectives of an alternative arrangement for angular positioning of display panels for the personal portable communication device.

FIG. 25 is a diagram of a control system for use with the display system of the personal portable communication device in non-expanded and expanded positions.

FIG. 26 is a perspective view of a personal portable communication device of the laptop/notebook computer type.

DETAILED DESCRIPTION OF THE INVENTION

Figure 1:
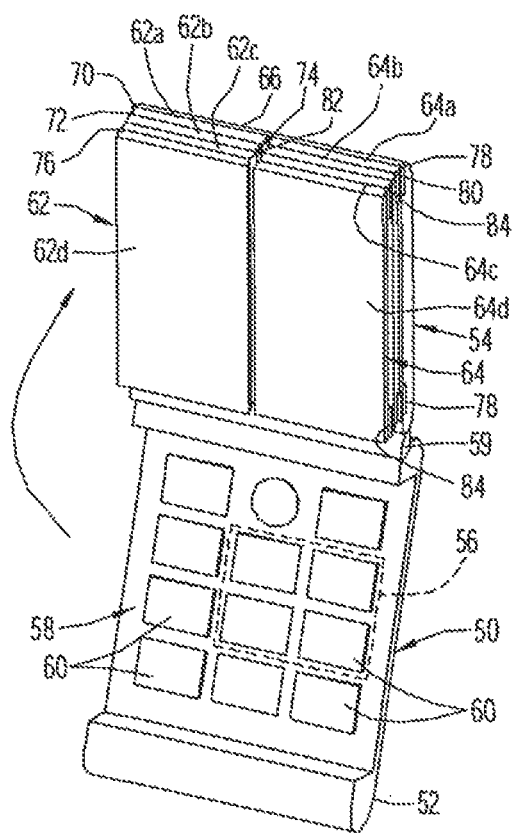
FIG. 1 is a perspective view of a personal portable communication device according to the present invention where the device has the general structure of a foldable or flip-type cell phone and the display system is in a stored/retracted position.

As used herein "personal portable communication device" means any electronic and/or digital device of a size to be hand-held by a user and that includes a processor providing signals relating to visual representation of display data of any type and a display system for producing the visual representation, where the display system is designed, and intended, for viewing by a single person. Examples of personal portable communication devices include, but are not limited to, mobile telephones (such as cell phones), laptop and notebook computers, personal communication devices, personal digital assistants, mobile and wired or wireless communication equipment and portable computers in general. As used herein "processor" means electronic circuitry for receiving signals from an input system carried by the personal portable communication device, such as touch-responsive switches, voice-responsive circuitry and camera signals, and for receiving signals from remote sources, such as message (voice and data) and image information from communication networks. As used herein "communication information" means signals of any type received by the processor including, but not limited to, wireless signals received from a communications network, such as a cellular network or a mesh network, signals received from any source either wireless or wired, signals received from an input system that is part of the personal portable communication device, such as touch-operated input switches, voice responsive (recognition) circuitry and cameras, and voice, image and data signals received from a source external of the personal portable communication device. As used herein "display data" means the visual representation to be shown by the display system and encompasses alpha-numeric characters and pictures, the latter including animate and inanimate objects, scenes and any views discernible to the eye whether still or video.

A personal portable communication device 50 in accordance with the present invention is shown in FIGS. 1-6 and includes a housing 52 carrying a display system 54, a processor 56 within the housing and an input system 58. The personal portable communication device 50 shown in FIGS. 1-5 has the general configuration of a mobile telephone (e.g. cell phone) with a foldable display hingedly supported on a pivot pin 59, usually incorporating a speaker therein as shown at 61. Accordingly, the input system 58 carried on the housing includes a keypad carrying a number of touch-operated input switches 60 for supplying communication signals to the processor. For example, the communication signals from the input system can relate to an address (phone number) with which communication is desired to be established, the name of a party being called, a message to be sent or stored or a command for operation of the processor. The number of input switches and the arrangement thereof on the housing and the foldable mounting of the display system depends on the type of personal portable communication device. For example, where the personal portable communication device is a personal digital assistant (PDA) or a BlackBerry (e.g. a device which supports e-mail, mobile telephone, text messaging, internet faxing, web browsing and the like), the display is typically rigidly (not hingedly) mounted to the housing and many more touch-operated input switches are carried on the housing in various arrangements.

In the embodiment shown in FIGS. 1-6, the display system 54 is formed of a lens segment or screen 62 on the left side of the personal portable communication device and a lens segment or screen 64 on the right side of the personal portable communication device. The screen 62 is formed of display panels 62a, 62b, 62c and 62d hingedly or pivotally connected together to permit screen 62 to be in a stored or retracted position shown in FIG. 1 and to be moved to a fully extended or deployed position shown in FIGS. 5 and 6. To this end, innermost display panel 62a is mounted to the left side of a central support 66 at upper and lower hinges 70 positioned at the back of screen 62. The central support 66 is mounted to housing 52 at pivot pin 59 and can be detachable therefrom to permit the display system to be removed from the housing. In this event, communication between the processor 56 and the display system would be wireless, for example using Bluetooth technology. Inner display panel 62b is hingedly mounted to display panel 62a at upper and lower hinges 72 at the front of screen 62. Inner display panel 62c is hingedly mounted to display panel 62b at upper and lower hinges 74 positioned at the back of screen 62, and outer display panel 62d, which also acts as a privacy portion or shield, is hingedly mounted to display panel 62c at upper and lower hinges 76 positioned at the front of screen 62.

Screen 64 has the same construction as screen 62 but is mounted to the right side of central support 66. Accordingly, screen 64 is a mirror image of screen 62 and is formed of display panels 64a, 64b, 64c and 64d hingedly or pivotally connected together to permit screen 64 to be in the stored or retracted position shown in FIG. 1 and to be moved to the fully extended or deployed position shown in FIG. 5. Innermost display panel 64a is mounted to the right side of central support 66 at upper and lower hinges 78 positioned at the back of screen 64. Inner display panel 64b is hingedly mounted to display panel 64a at upper and lower hinges 80 at the front of screen 64. Inner display panel 64c is hingedly mounted to display panel 64b at upper and lower hinges 82 positioned at the back of screen 64, and outer display panel 64d, which also acts as a privacy portion or shield, is hingedly mounted to display panel 64c at upper and lower hinges 84 positioned at the front of screen 64.

Figure 2:
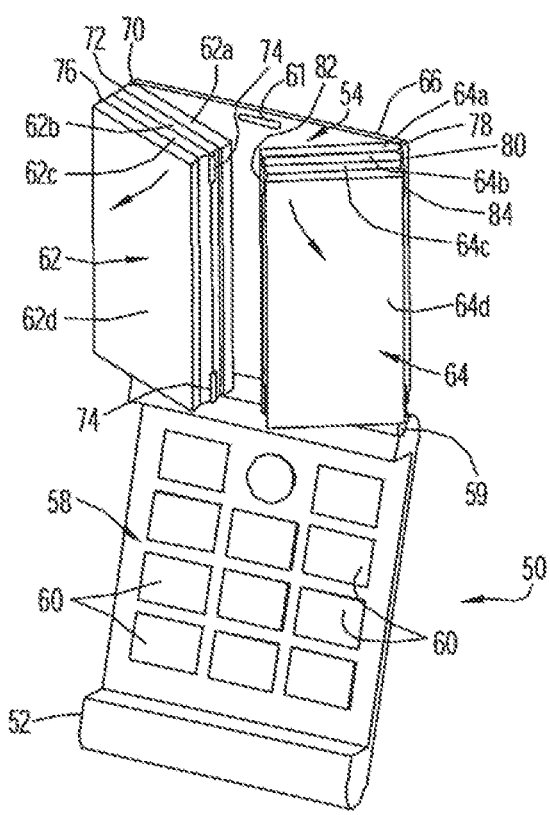
FIGS. 2, 3, 4 and 5 are perspective views of the personal portable communication device of FIG. 1 in various stages of movement of the display system from the stored/retracted position to a fully extended, deployed position.
Figure 3:
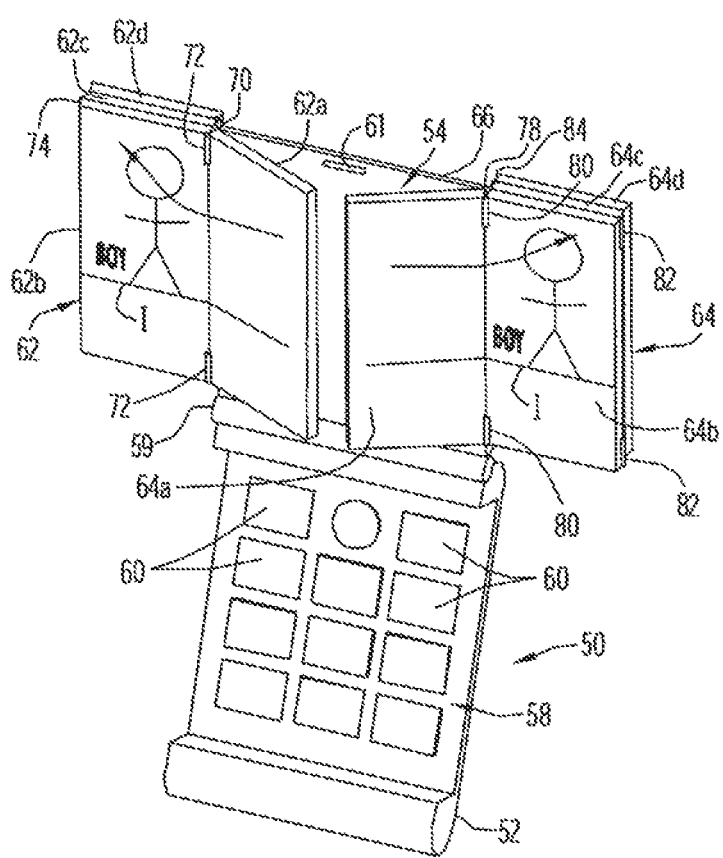
Figure 4:
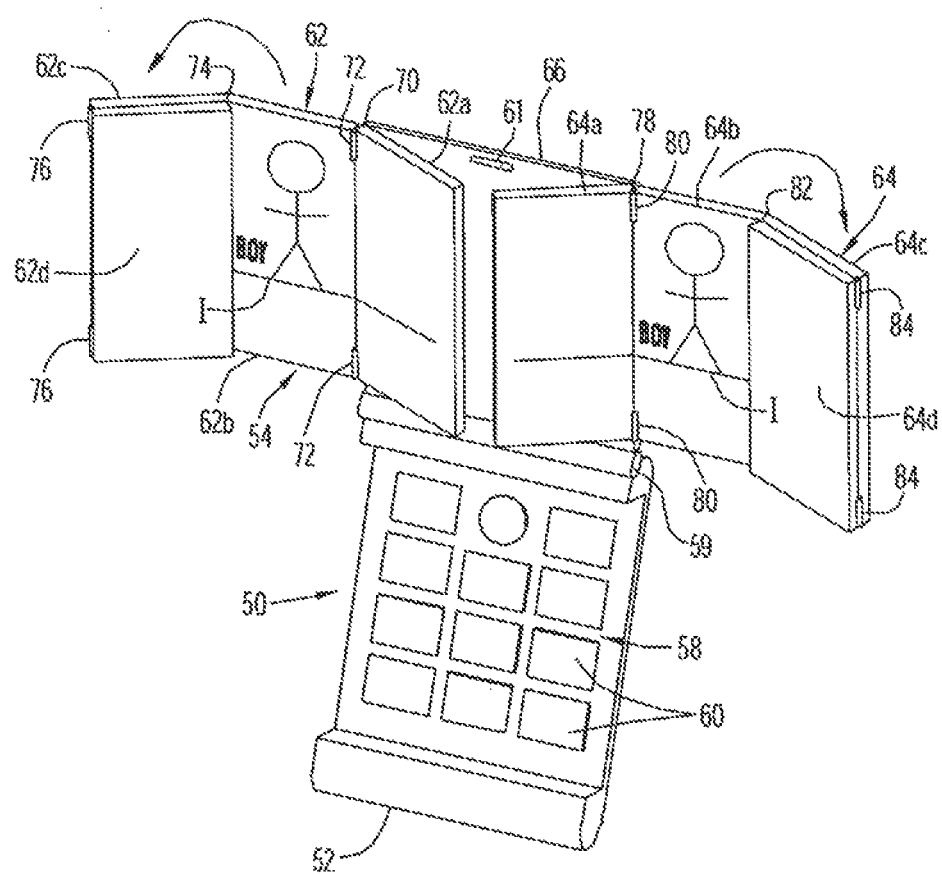

When the display system is in its stored or retracted position, the display panels of each screen are adjacent one another (i.e. face-to-face) and, preferably, within the confines of the perimeter of central support 66 and the lateral sides of housing 52 as shown in FIG. 1. To move the display system to an extended or deployed position, the display panels of each screen are hingedly moved as a group to pivot in a direction outwardly from the lateral edges of the personal portable communication device on hinges 70 and 78, respectively, as shown in FIG. 2; and, thereafter, display panels 62b, 62c and 62d and display panels 64b, 64c and 64d are pivoted outwardly to the position shown in FIG. 3 where only display panels 62a and 62b of screen 62 and display panels 64a and 64b of screen 64 are visible. When display panels 62a, 62b and 62c and display panels 64a, 64b and 64c are further pivoted to extended positions, display panels 62d and 64d are against (face-to-face with) display panels 62c and 64c, respectively, as shown in FIG. 4 to place the display system in a position where display panels 62a, 62b, and 62c of screen 62 and display panels 64a, 64b and 64c of screen 64 are visible with display panels 62a and 64a being inner display panels and display panels 62b and 64b being outer display panels and the backs of display panels 62d and 64d facing display panels 62a, 62b and 64a, 64b, respectively, to provide privacy for images on screens 62 and 64. Display panels 62d and 64d can be pivoted to the fully extended or deployed position shown in FIGS. 5 and 6. As shown, the outermost display panels 62d and 64d are extended laterally beyond the central support and the perimeter of the personal portable communication device while the innermost display panels 62a and 64a remain within the confines of the central support member and the perimeter of the personal portable communication device.

Figure 5:
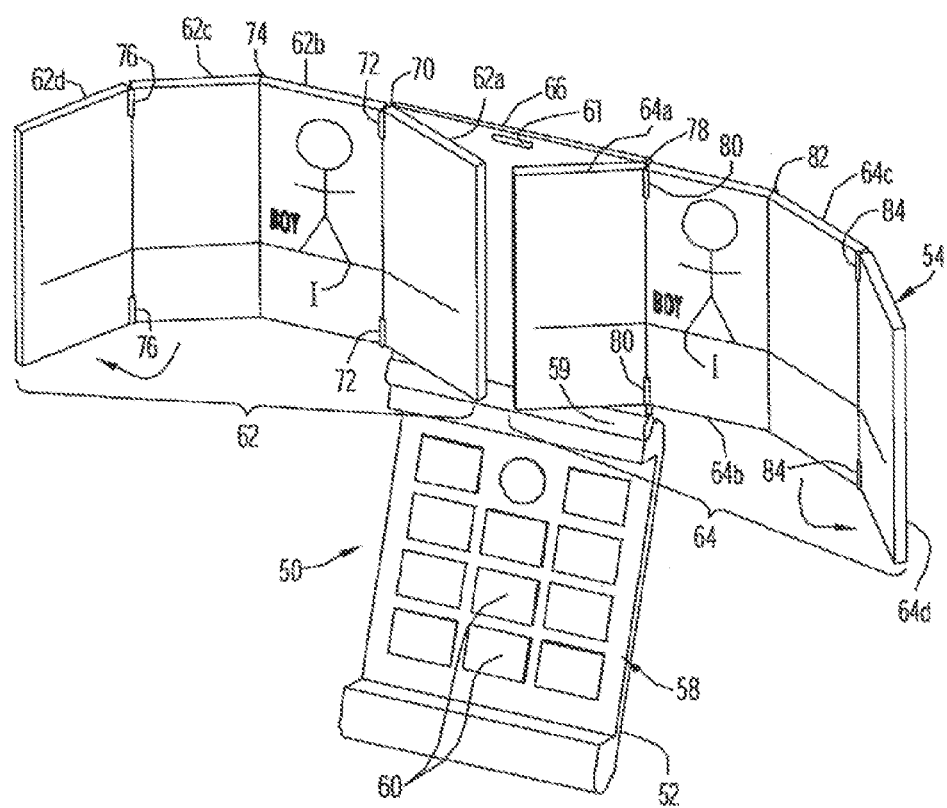
Figure 6:
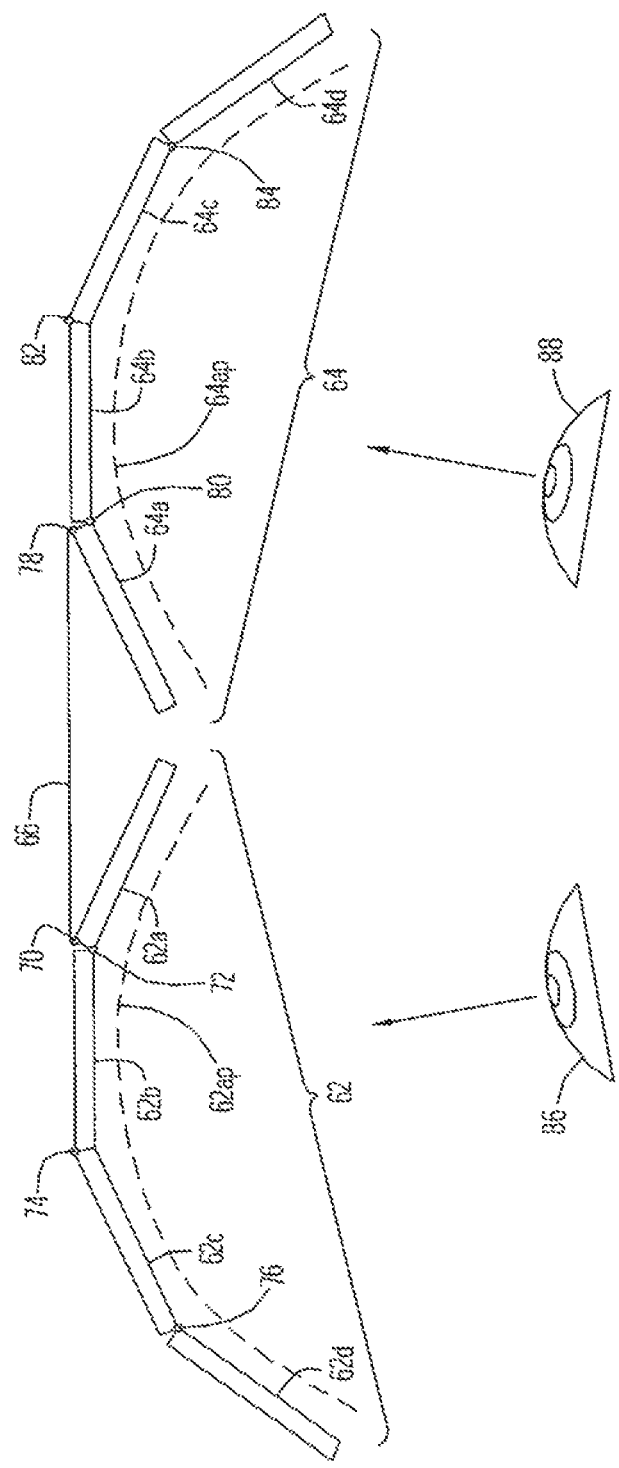
FIG. 6 is a partial top view of the display system of FIG. 5 in the fully extended, deployed position and showing the contour of the display panels relative to eyes of a user.

As noted above, the display system 54 is shown in FIG. 1 with the display panels in a stored or retracted position generally within the confines of the lateral edges of the housing 52 and is shown in FIG. 5 in the fully deployed position which is shown from a top view, and more schematically, in FIG. 6. The display panels provide stereoscopic visual representations that can be used to produce a three-dimensional (3D) picture utilizing two different views of data to be displayed, one view being primarily seen by one eye of an individual (the left eye 86) and the other view being primarily seen by the other eye of the individual (the right eye 88). If the individual has similar sight in each eye, the result is an acceptable 3D picture. Essentially, the individual's brain combines the two images as occurs during normal viewing of any scene or object. Essentially objects seen at the same distance from a viewer's eye follow the circumference of a circle with a radius determined by the focal length of the eyes. To present images properly to each eye, the display system of the personal portable communication device 50 produces images on essentially arcuate portions shown by dashed lines 62ap and 64ap, for left and right screens 62 and 64, respectively. The arcuate portions are formed by four panels for each screen as shown in FIG. 6. Any number of display panels can be utilized to form a screen for 3D viewing so long as, when deployed, the hinged arrangement of the display panels provide a reasonable approximation of an arcuate circumference. Of course, for 2D viewing, an arcuate position is not required but the outer panels should extend toward the viewer for privacy. Accordingly, the screens can be formed by more than four display panels or by less than four display panels, for example the arrangements shown in FIGS. 3 and 4.

Figure 7:
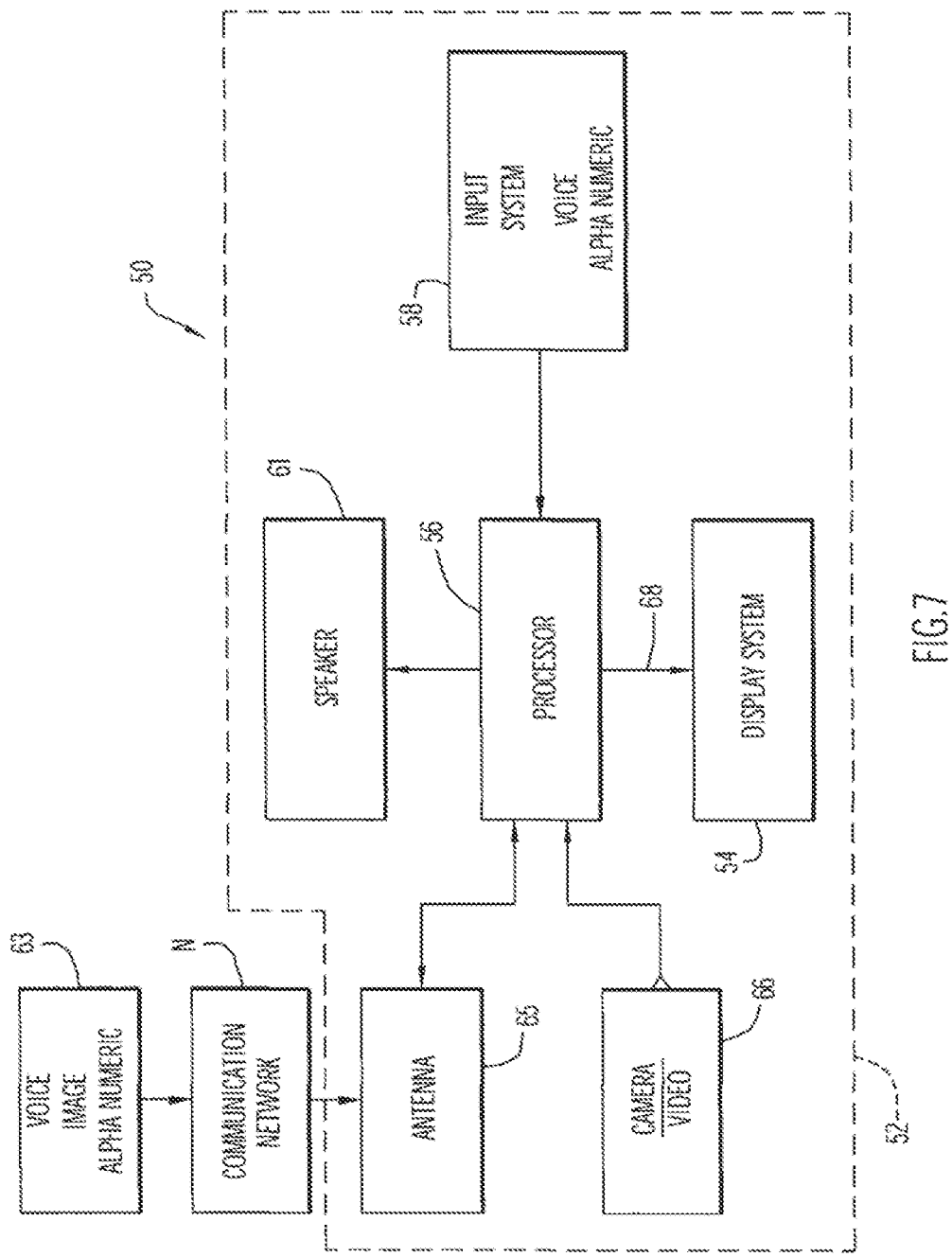
FIG. 7 is a block diagram showing the components of the personal portable communication device for use with a communication network.
Figure 12:
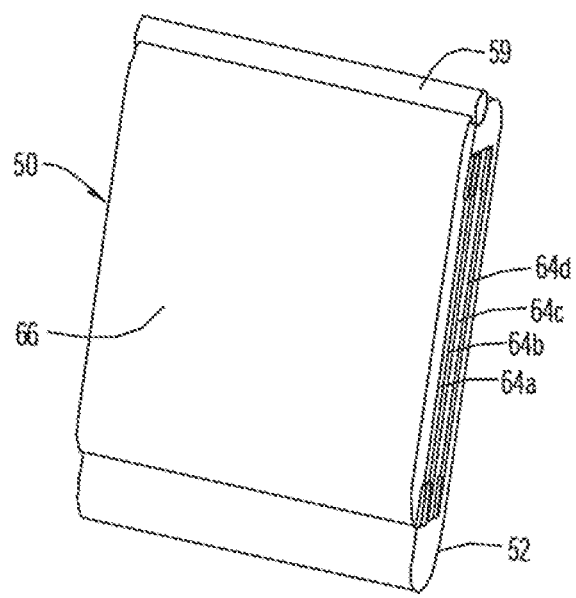
FIG. 12 is a perspective view of the personal portable communication device of FIG. 1 with the display system in a closed position.

A block diagram of the components of the personal portable communication device 50 is shown in FIG. 7 coupled with a wireless or wired communication network N which supplies voice, alpha-numeric and/or image remote input signals 63 to an antenna/receiver 65 carried by the housing 52. Remote signals from antenna/receiver 65 are supplied as input signals to processor 56 which also receives local input signals from systems carried by the housing, for example, image signals from a still or video camera means 66 (controlled by the processor), which can include DVD signals, and data input signals from input system 58. The remote and local input signals are referred to herein as "communication signals." The processor 56 supplies display signals 68 to display system 54 to form a single visual representation of display data via pixels on each of the screens 62 and 64 as depicted at I in FIGS. 3, 4 and 5. Of course, if desired and particularly when the display system is primarily used for privacy, a single visual representation of the display data can be displayed using both screens 62 and 64. The visual display can be created in any manner, such as using LCD, LED and/or plasma technologies. The display signals can be supplied to the display system in a wired manner or in a wireless manner, e.g. using Bluetooth technology. The display signals 68 are supplied to the display system in accordance with the screen configuration and pixels being used for the display data. The user can supply information to the processor relating to the screen configuration and pixels being used for display data via the input switches of the input system 58, or the information relating to the screen configuration and pixels being used for display data can be supplied to the processor via sensors on the display system where the screens are configured manually or mechanically. Of course, the information relating to the screen configuration and pixels being used for display data can also be obtained from the electronic command signals where micromotors are used as shown in FIGS. 11 and 12. The display system can be detachable from the housing; and, in this case, wireless transmission of display signals to the display system is preferred.

Figure 9:
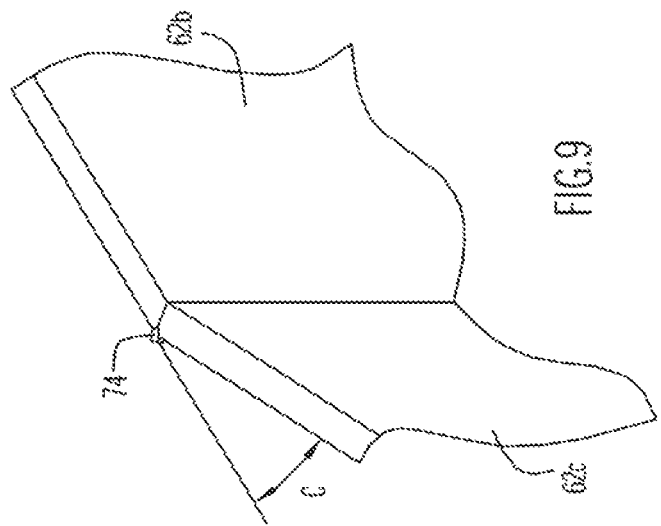
FIGS. 8 and 9 are partial perspectives of hinge and side structures for the display panels for the personal portable communication device.
Figure 8:
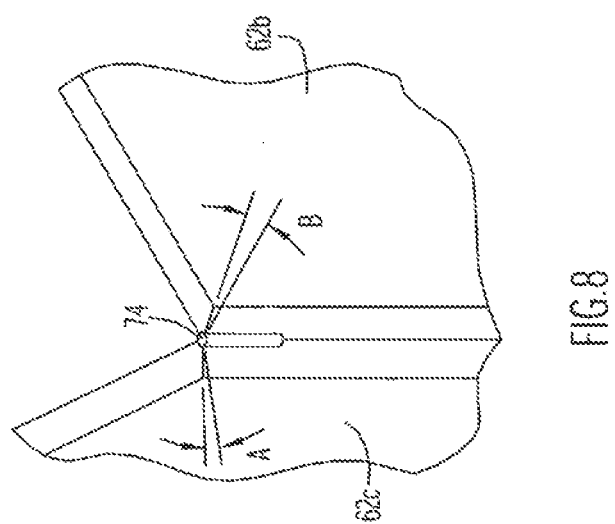

As shown in FIG. 1, the display panels are illustrated in an exemplary configuration where the display panels are stored in the front of the personal portable communication device. In this embodiment, each display panel is illustrated as having a width essentially 50% of the width of the support member or housing. Hinge structures permit the four display panels to extend to their operating or deployed position. The extension and the folding of the display panels can be performed manually to ensure that a proper curvature is obtained for a particular user/viewer. As shown in FIGS. 8 and 9, adjacent display panels, for example display panels 62b and 62c, can have chamfered or beveled sides as shown at angles A and B such that, when the display panels are deployed, abutment of the sides creates an angle C to help form the arcuate portions of the screens. The angles between adjacent display panels should be less than 180°, particularly between inner and outer display panels, and the angles can be controlled manually by using hinge arrangements with sufficient friction between hinge components to allow the display panels to remain in manually deployed positions. Alternatively, as shown in FIGS. 10 and 11, the hinged display panels, for example display panels 62b and 62c, can be opened and closed using electronic command signals from processor 56 to drive a micromotor 90 and a gear 92 to achieve a desired angle C between adjacent display panels to achieve desired screen curvature. The micromotor 90 is mounted on one display panel, e.g. 62b, and the gear 92 has teeth 94 engaging complimentary recesses 96 in the adjacent display panel, e.g. 62c. In the fully deployed position shown in FIGS. 5 and 6, the outermost display panels 62d and 64d provide a privacy function to reduce, as much as is practical, the ability of a person other than the direct viewer, from viewing the visual representation/picture.

After use, the display panels are refolded to the storage/retracted position shown in FIG. 1. The display system can be mounted on the personal portable communication device at any desired position, primarily dependent on the type of personal portable communication device on which the display system is mounted. Where a personal portable communication device is a mobile phone of the foldable or flip-style type, as shown in FIG. 1, when the personal portable communication device is not in use, the display system can be folded to the position shown in FIG. 12 by pivoting the central support 66, and the display panels in the retracted state, about pivot pin 59 such that display panels 62d and 64d face the keypad of input system 58.

Figure 13:
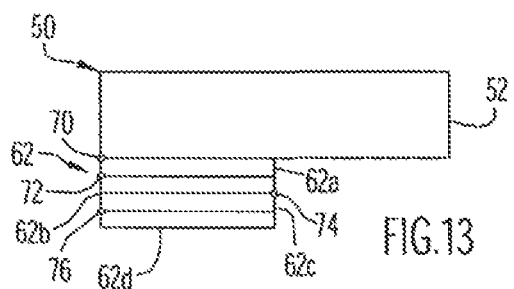
FIGS. 13, 14 and 15 are simplified representations of a modification of the personal portable communication device mounting display systems in a stored position, a position during deployment and in a fully deployed position, respectively.
Figure 14:
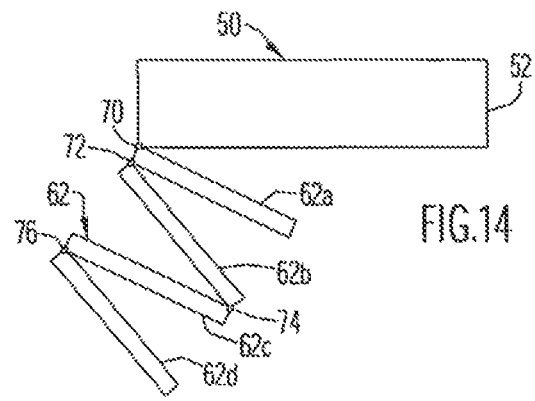
Figure 15:
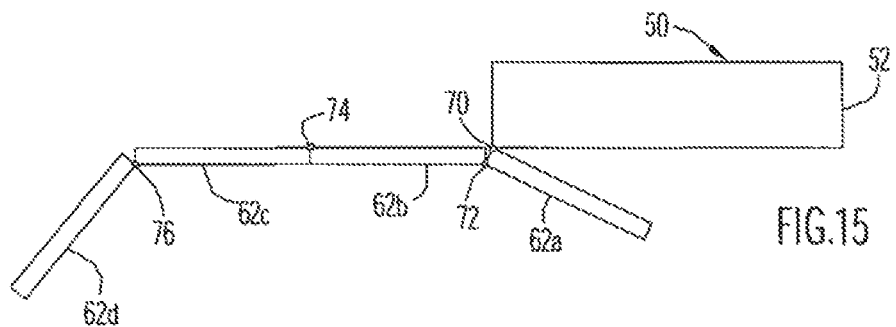

Top views of a modification of the personal portable communication device are shown in FIGS. 13, 14 and 15 with screen 62 in a stored/retracted position, a partially deployed position and a fully deployed position, respectively. The display panels 62a, 62b, 62c and 62d, as shown in FIG. 13, are stored in front of the housing 52 of a personal portable communication device 50, while FIG. 14 shows the display panels of screen 62 pivoting together as opposed to the pivoting of each display panel individually as shown in FIGS. 2, 3 and 4. Screen 62 as shown in FIG. 15 has display panels 62b and 62c in a co-planar arrangement such that screen 62 still approximates a curvature due to angled innermost display panel 62a and angled outer display panel 62d. Accordingly, while the arrangement of display panels shown in FIG. 15 is effective for 3D image presentation as described herein, the arrangement provides privacy due to outer display panel 62d extending away from housing 52 toward the user of the personal portable communication device. The right screen 64 is not shown in FIGS. 13, 14 and 15; however, it should be understood that the construction of screen 64 is a mirror image of screen 62 but mounted on top of the right side of housing 52.

Figure 16:
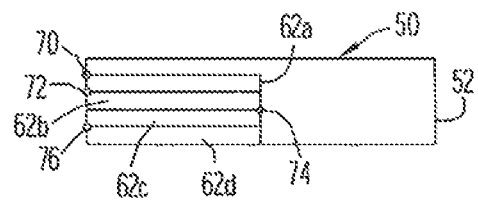
FIGS. 16, 17 and 18 are simplified representations of another modification of the personal portable communication device mounting display systems in a stored position, a position during deployment and in a fully deployed position, respectively.
Figure 17:
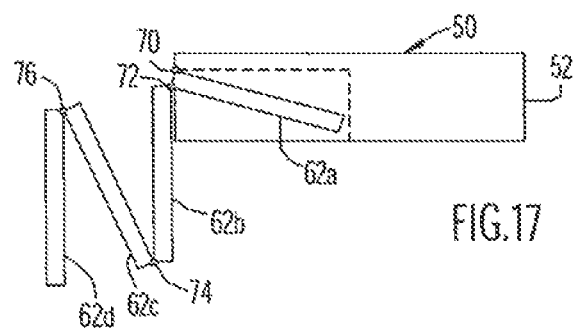
Figure 18:
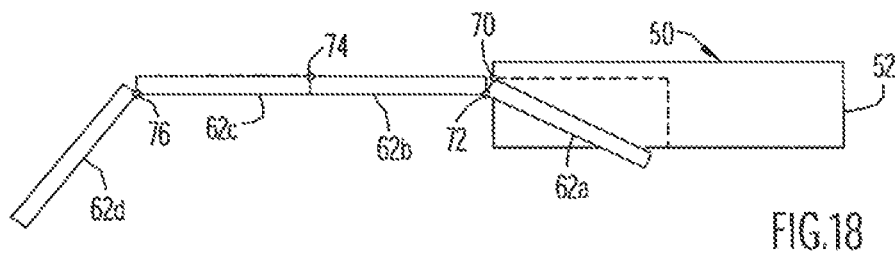

Top views of screen 62 of another modification of the personal portable communication device are shown in FIGS. 16, 17 and 18 in a stored/retracted position, a partially deployed position and a fully deployed position, respectively. The display panels 62a, 62b, 62c and 62d, as shown in FIG. 16, are stored on top of the housing 52 of personal portable communication device 50, while FIG. 17 shows the display panels of screen 62 pivoting together as opposed to the pivoting of each display panel individually as shown in FIGS. 2, 3 and 4. Screen 62 as shown in FIG. 18 has display panels 62b and 62c in a co-planar arrangement such that screen 62 still approximates a curvature due to angled innermost display panel 62a and angled outer display panel 62d. Accordingly, while the arrangement of display panels shown in FIG. 18 is effective for 3D image presentation as described herein, the arrangement provides privacy due to outer display panel 62d extending away from housing 52 toward the user of the personal portable communication device. The right screen 64 is not shown in FIGS. 16; 17 and 18; however, it should be understood that the construction of screen 64 is a mirror image of screen 62 but mounted on the right side of the front of the housing 52.

Figure 19:
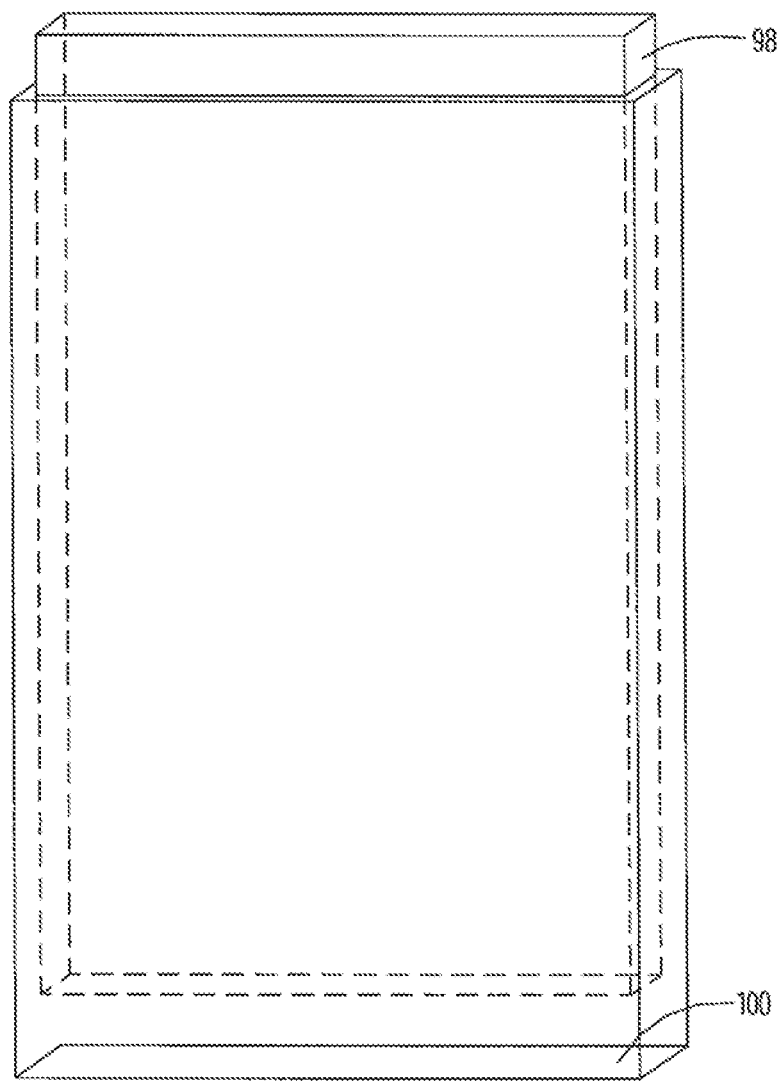
FIG. 19 is a perspective view of a display panel for the personal portable communication device having a movable segment.

The height of the display panels can be increased by storing a movable second segment 98 of a display panel 100 within or behind the display panels as shown in FIG. 19. The second segment can be spring loaded to "pop up" on command or can be slid up manually or electronically. The use of the additional segments provides increased viewing, and there are numerous other ways of expanding the screens produced by the display system.

Figure 20:
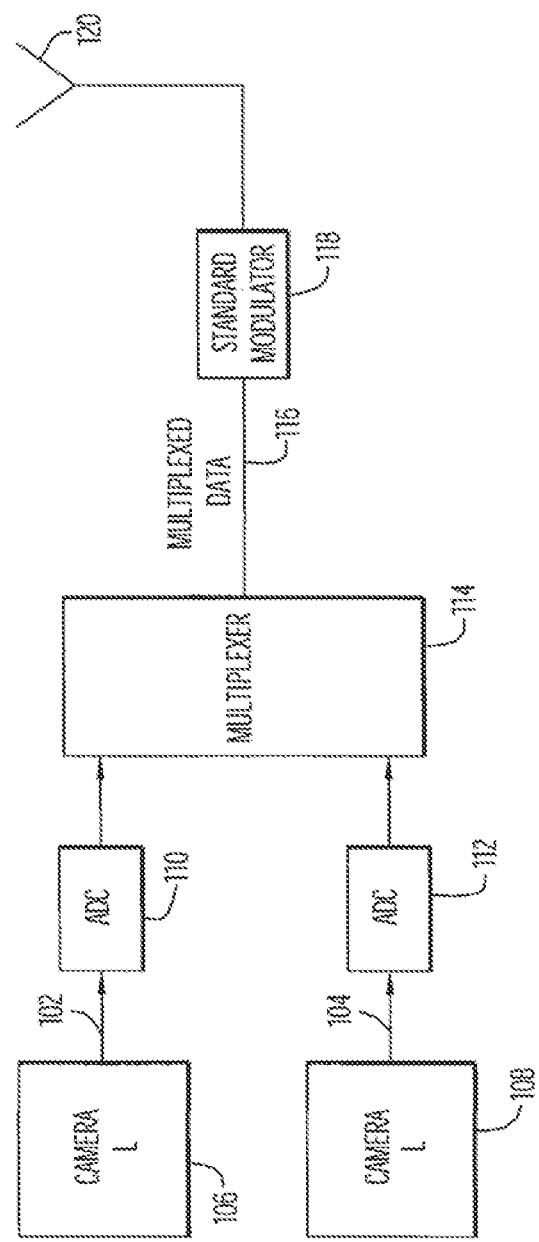
FIG. 20 is a block diagram of a system for transmitting two images to the personal portable communication device.

In order to achieve three-dimensional (3D) effects using a stereoscopic technique, two cameras spaced apart can be used to produce communication signals for supply to the processor 56, it being appreciated that for a standard two-dimensional (2D) visual representation only a single camera is used. The communication signals from the cameras can be produced from a remote source, i.e. 63, or from a local source, i.e. 66. For example, the remote camera communication signals can be from a 2D or 3D video/movie and/or still image via the network N while the local camera communication signals can be from a 2D or 3D video/movie and/or still image generated by components carried by the personal portable communication device such as camera/video 66 or a DVD player associated therewith. Shown in FIG. 20 is one example of a system for transmitting two images to the personal portable communication device. As shown in FIG. 20, electronic signals 102 and 104 representing images from the left camera 106 and the right camera 108, respectively, are digitized by analog-to-digital converters 110 and 112, respectively, and multiplexed together by multiplexer 114 prior to transmitting the combined signal 116 via a standard modulator 118 and antenna 120. If each of the original camera signals is to be transmitted at the same original rate, the composite signal should be transmitted at twice that rate and, thus, uses twice the bandwidth. To avoid this situation, the modulation can be changed from, for example, 16QAM to 256QAM. Alternatively, standard data compression can be used. The above, and other similar techniques, are well known to persons of ordinary skill working in the communications field. After the multiplexed data signal is received by the personal portable communication device, the received signal is demultiplexed to recover the left and right wave forms for supply to the left and right display screens.

Figure 21:
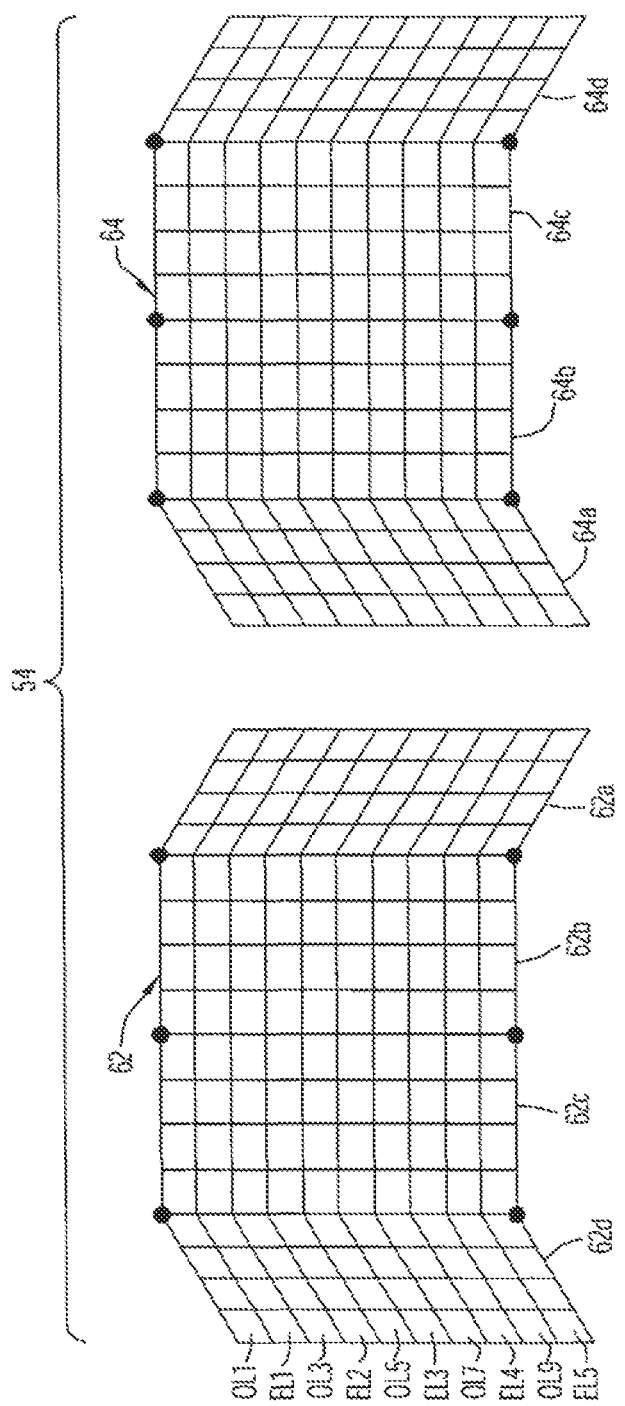
FIG. 21 is a simplified representation of screens of a display system for a personal portable communication device illustrating odd and even lines for display.

Normally, an image is displayed line by line in a conventional personal portable communication device. If there are, for example, 1000 lines per display, the odd lines (the odd field) are displayed first followed by sweeping out the even lines in order to optimally use the retentive power of the eye. Otherwise, the top of the picture would "fade" by the time the bottom is viewed. The sweeping of the first 500 odd numbered lines, referred to as the first field, and the sweeping of the second 500 even numbered lines, referred to as the second field, occur in the United States at a rate of 1/30 of a second each. The total, referred to as a frame, occurs 15 times/second. To illustrate the principal of screen display, FIG. 21 shows screens 62 and 64 of display system 54 with ten lines per scan constituted by five lines OL1, OL3, OL5, OL7 and OL9 in the odd field and five lines EL2, EL4, EL6, EL8 and EL10 in the even field, the odd and even lines running horizontally through display panels 62a, 62b, 62c and 62d of screen 62 and display panels 64a, 64b, 64c and 64d of screen 64 thus forming pixels such that an entire frame of a picture can be considered as formed of boxes with each box receiving a G, R and B signal to produce a resulting color and intensity of color. Thus, each box can be thought of as the resolution of the display system. In the United States, standard television is about 500×500 or about 250,000 pixels. In the example shown in FIG. 21, each frame consists of 250 pixels in each of the left and right eye screens 62 and 64. The left eye signal is swept across odd lines OLI1, OLI3, OLI5, OLI7 and OLI9 and then across lines EL2; EL4, EL6, EL8 and EL10. The sweep continues across all four display panels before starting at the beginning of the next specified line. Of course, the same procedure is used for the right eye signal.

Alternatively, two fields in a frame of video can be used to represent the left and right eye images for viewing with one field (i.e. left) displayed on the left eye screen 62 and the other field (i.e. right) displayed on the right eye screen 64. This procedure produces a 3D effect, particularly when the objects photographed are moving, and can be used without requiring two cameras.

The personal portable communication device can be operated in a two dimensional mode while providing privacy since the outer or end display panels 62d and 64d are turned in toward the user of the personal portable communication device. As described above, the display panels can be designed so that the angular arrangement of adjacent display panels is fixed or is under the control of the user. In the latter case, a particular setting is selected by the user, and the display panels can be appropriately pivoted manually, electronically or mechanically.

Figure 22:
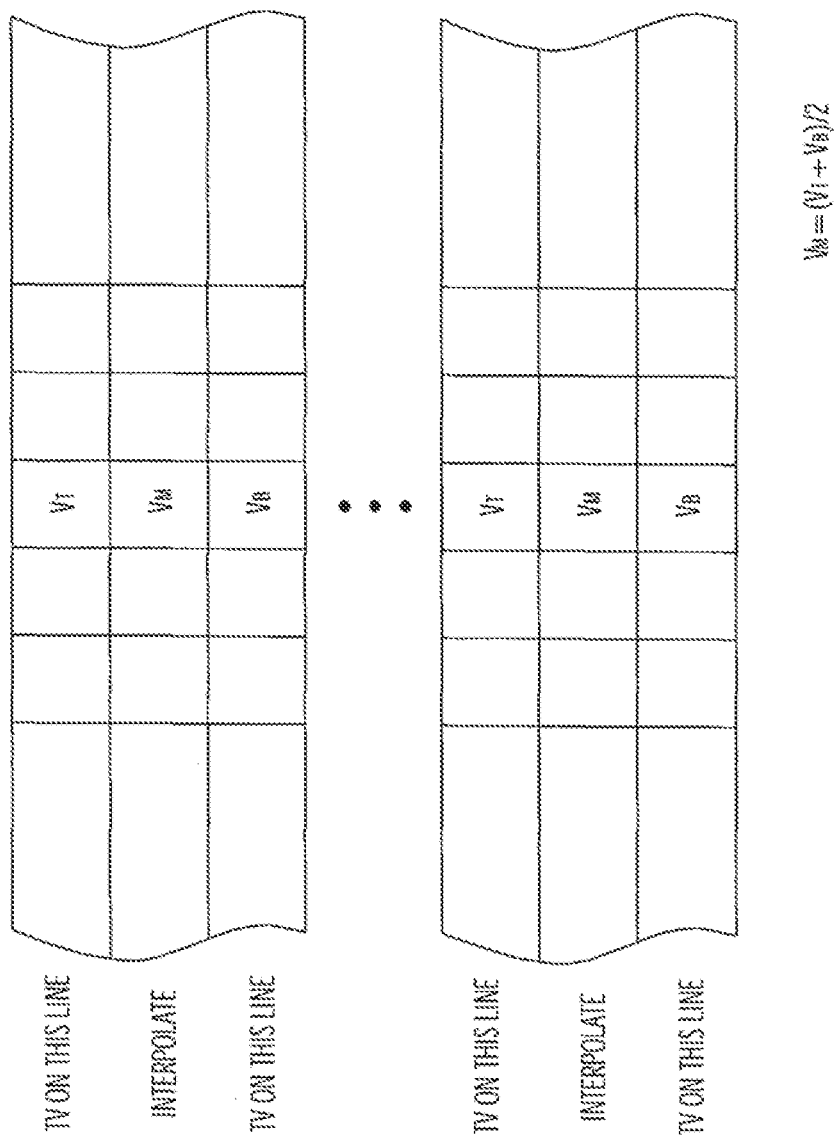
FIG. 22 illustrates interpolation where an expanded screen is utilized for the personal portable communication device.

With the personal portable communication device display system in a position with the movable display panel segments extended as shown in FIG. 19, the left and right video inputs start the line sweep at the top of the movable panel segments and end the line sweep at the bottom of the panels. If a basic panel contains 500 lines, then doubling the size of the panel results in 1000 lines. However, data is only available for 500 lines. Obviously, every other line (alternate lines) could be skipped; however, a more acceptable picture is obtained with greater clarity if every odd line is used and the even lines filled in with a voltage which is the average of the value directly above and below. The above interpolation is illustrated in FIG. 22 where the middle line is interpolated to be the average, $VM=(VT+VB)/2$, it being noted that more elaborate interpolation techniques can be used.

Figure 24:
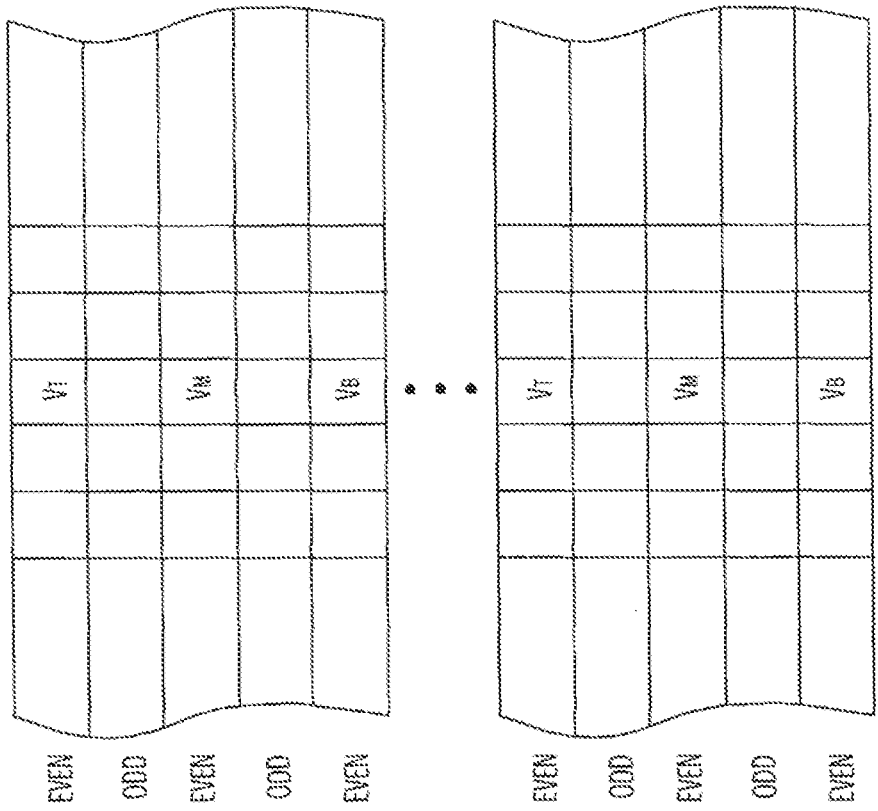
FIGS. 23 and 24 illustrate non-expanded and expanded lines for a display system for the personal portable communication device.
Figure 23:
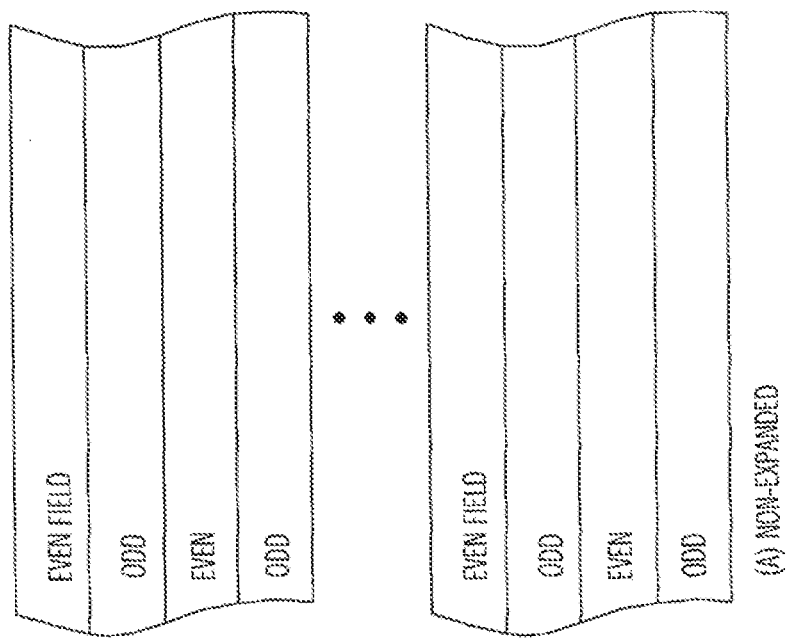

Since television broadcasts employ an even field and an odd field as shown in FIG. 23, when expanded, the display is as shown in FIG. 24. When the display system is expanded in height by expanding each of the panels as shown in FIG. 19, the electronic control signal is changed so that the signal sweep starts at the top of the expanded panel and ends at the last appropriate row of the standard panel. The "skipping" of rows must be initiated, with the interpolation procedure becoming operational, the above being achieved by the original control activated by the user to expand the display system. An example of such a control is illustrated in FIG. 25 where a control signal 120 routes a television video signal 122 to the top line of the expanded display system in the expanded mode or to the top line of the regular display system in the unexpanded mode via AND gates 124 and 126 and inverter 128. Alternate control circuitry is well known to those of ordinary skill in the communication/television field.

In an additional mode of operation, the personal portable communication device display can be employed by connecting the left and right screens together in the middle and sweeping the picture data from left to right across the entire set of display panels i.e. both screens.

An embodiment where the personal portable communication device 50? is a laptop/notebook computer is shown in FIG. 26. It is noted that such computers normally have reduced width keyboards with hinged displays such that the devices are easily portable and designed for use by a single user, i.e. personal. Typically, the displays for such computers are hingedly mounted to the keyboards/housings and a display system 54? is shown formed of hingedly connected display panels including an array of inner display panels 130 and opposing outer display panels 132 and 134 extending toward the user of the computer, the outer display panels 132 and 134 being connected to the left and right ends of the inner display panels by hinges 136 and 138, respectively. As in all the embodiments disclosed herein, the display system can be detachable from the housing, and the display panels can be angularly adjustable. The inner display panel arrangement can be formed of a single display panel or multiple display panels angularly adjustable relative to adjacent inner display panels to produce an arcuate portion for the display system or co-planar to produce an inner rectilinear portion for the display system. Alternatively, the inner display panels 130 can be rigidly connected to be co-planar or curved, or the inner display panels can be formed by a single panel. The outer display panels 132 and 134 extend angularly toward the keyboard/housing 140 to provide privacy for the images displayed while also being capable of showing images as part of, or in addition to, the images displayed on the inner display panels. Since the outer display panels are hingedly connected to the inner display panels, the display system can be folded to a compact, retracted, storage position to facilitate portability.

Figure 27:
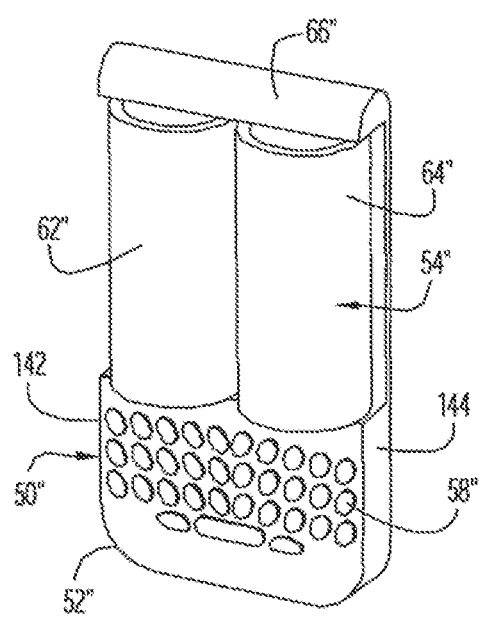
FIGS. 27 and 28 are perspective views of a personal portable communication device with a flexible display system in a stored/retracted position and a fully extended position, respectively.
Figure 28:
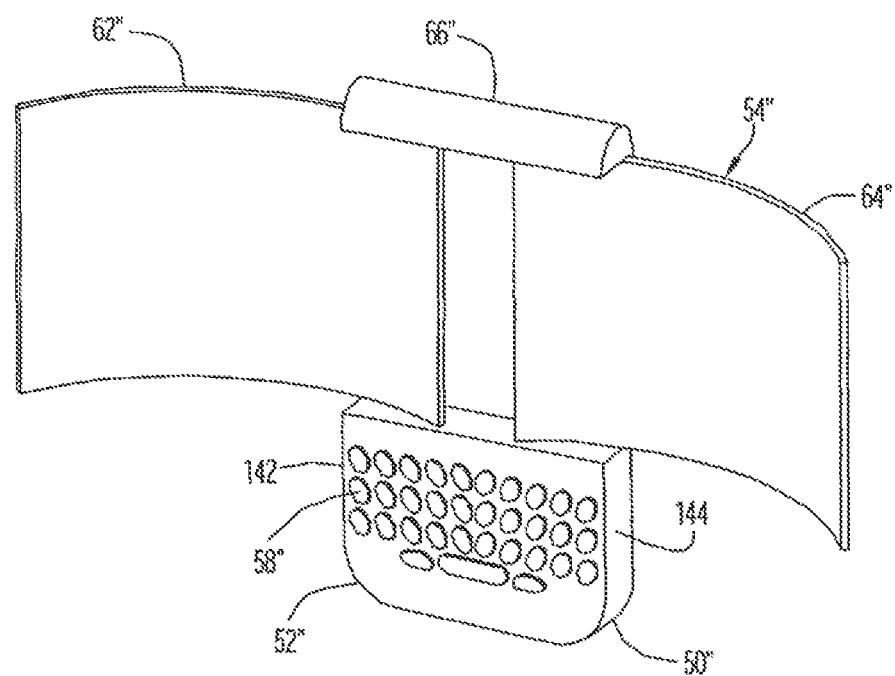

Another embodiment of a display system 54? for a personal portable communication device 50? is shown in FIGS. 27 and 28 with the display system in stored/retracted and extended positions, respectively. The personal portable communication device 50? is shown, for exemplary purposes as a Blackberry, with the input system 58? having left and right screens 62? and 64,? respectively, each formed as a flexible member mounted on a central support 66?. The screens 62? and 64? can have any desired structure, for example, the flexible display structure described at http://www.ices.cm-u.edu/design/foldabledisplay.html, allowing the screens to be rolled up, furled or unfolded to an extended position where the screens present an extended imaging area. As shown, the imaging area extends beyond the lateral sides 142 and 144 of a housing 52? for the personal portable communication device 50?. The screens 62? and 64? form arcuate portions for 3D imaging as explained above and/or for privacy of viewing the image provided by the display system.

The display system need not extend beyond the edges of the housing when the display system is in the deployed position. For example, where the image data is display at a 90° perspective relative to that shown in the drawings, the screens may not extend beyond the edges of the housing; or, if the housing has a sufficient width or height, the screens may not extend beyond the edges of the housing.

Inasmuch as the present invention is subject to many variations, modifications and changes in detail, it is intended that all subject matter discussed above or shown in the accompanying drawings be interpreted as illustrative only and not be taken in a limiting sense.

What is claimed is:

1. A hand-held personal portable communication device providing a three-dimensional visual representation of display data comprising a housing;

a processor carried by said housing providing first and second sets of display signals relating to a three-dimensional visual representation of display data;

an input system carried by said housing providing communication signals to said processor; and a display system carried by said housing and receiving said first and second sets of display signals, said display system being formed of a left display screen and a right display screen, wherein each display screen is formed of a plurality of display panels including an inner panel and an outer panel hingedly connected with said inner panel, said inner and outer panels having a stored position where said outer panel is adjacent said inner panel and a deployed position where said outer panel is in a position non-planar with said inner panel and extends from said inner panel at an angle less than 180°, each of said inner and outer panels having a plurality of pixels and said first set of display signals including digital data supplied to said inner panel in said deployed position and said second set of display signals including digital data supplied to said outer panel in said deployed position to form a three-dimensional visual representation due to said non-planar position of said inner panel pixels and said outer panel pixels.

2. A hand-held personal portable communication device as recited in claim 1 wherein each display screen includes an additional panel including a plurality of pixels, said additional panel has first and second spaced lateral edges, each outer panel being hingedly connected with said first lateral edge, each inner panel being hingedly connected with second lateral edge.

3. A hand-held personal portable communication device as recited in claim 1 wherein said left display screen and said right display screen each have arcuate portions in said deployed positions.

4. A hand-held personal portable communication device as recited in claim 3 wherein said arcuate portion of said left and right display screens provide different visual displays.

5. A hand-held personal portable communication device as recited in claim 1 wherein said inner and outer panels carry segments movable to extended positions to increase the heights of said inner and outer panels.

6. A method for presenting a three-dimensional visual representation of display data on a hand-held personal portable communication device comprising the steps of providing a hand-held personal portable communication device having a housing carrying a display system movable from a stored position to a deployed position to form a left screen extending laterally beyond a left edge of the housing and a right screen extending laterally beyond a right edge of the housing, the left and right screens being in non-planar relation in the deployed position;

utilizing first and second cameras to obtain electronic image signals of display data from first and second perspectives, respectively;

wherein the left screen and the right screen are formed of a plurality of display panels including an inner panel and an outer panel hingedly connected with said inner panel, said inner and outer panels having a stored position where said outer panel is adjacent said inner panel and a deployed position where said out er panel is in a position non-planar with said inner panel and extends from said inner panel at an angle less than 180°; and supplying the electronic image signals to the display system of the personal portable communication device such that the electronic image signals from the first camera are used to depict the display data on the left screen and the electronic image signals from the second camera are used to depict the display data on the right screen whereby visualizing the display data on the left and right screens simultaneously produces a three-dimensional image of the display data due to said non-planar positions.

7. A method for presenting a three-dimensional visual representation of display data on a hand-held personal portable communication device comprising the steps of providing a hand-held personal portable communication device having a housing carrying a display system movable from a stored position to a deployed position to form a left screen extending laterally beyond a left edge of the housing and a right screen extending laterally beyond a right edge of the housing, the left and right screens being in non-planar relation in the deployed position;

utilizing camera means to obtain electronic image signals of display data in odd and even fields;

wherein the left screen and the right screen are each formed of a plurality of display panels including an inner panel and an outer panel hingedly connected with said inner panel, said inner and outer panels having a stored position where said outer panel is adjacent said inner panel and a deployed position where said outer panel is in a position non-planar with said inner panel and extends from said inner panel at an angle less than 180°; and supplying the electronic image signals to the display system of the personal portable communication device such that the odd fields are used to depict the display data on the left screen and the even fields are used to depict the display data on the right screen whereby visualizing the display data on the left and right screens simultaneously produces a three-dimensional image of the display data due to said non-planar positions.

8. A method for presenting a three-dimensional visual representation of display data on a hand-held personal portable communication device as recited in claim 7 wherein said supplying step includes interpolating alternative lines of the odd and even fields.

9. A method for presenting a three-dimensional visual representation of display data on a hand-held personal portable communication device as recited in claim 8 wherein said interpolating step includes arranging voltage values of lines directly above and below the interpolated line.

10. A hand-held personal portable communication device for providing a three-dimensional visual representation of display data comprising a housing having left and right lateral edges on opposing sides;

a display system carried by said housing having a deployed position and including a first screen extending laterally from said left edge away from said housing in said deployed position and a second screen extending laterally from said right edge away from said housing in said deployed position;

a processor carried by said housing providing display signals to said display system relating to visual representation of display data, said display signals including a first set of display signals supplied to said first screen and a second set of display signals supplied to said second screen, said first and second sets of display signals creating substantially the same image on each of said first and second screens;

wherein the first screen and the second screen are each formed of a plurality of display panels including an inner panel and an outer panel hingedly connected with said inner panel, said inner and outer panels having a stored position where said outer panel is adjacent said inner panel and a deployed position where said outer panel is in a position non-planar with said inner panel and extends from said inner panel at an angle less than 180°; and said first screen having a shape to form a substantially arcuate portion with a center of curvature at the left eye of a user of the personal portable communication device and said second screen having a shape to form a substantially arcuate portion with a center of curvature at the right eye of the user whereby the view of the user's left eye is substantially the display data on said first screen and the view of the user's right eye is substantially the display data on said second screen to provide a three-dimensional visual representation of display data due to said non-planar positions.

11. A hand-held personal portable communication device as recited in claim 10 wherein said display system has a retracted position adjacent said housing and said first and second screens are movable to be disposed adjacent said housing when said display system is in said retracted position.

12. A hand-held personal portable communication device as recited in claim 11 wherein said first and second screens each include a plurality of hingedly connected display panels.

13. A hand-held personal portable communication device as recited in claim 11 wherein said first and second screens each include flexible members capable of being contracted when said display system is in said retracted position and extended when said display system is in said deployed position.

14. A hand-held personal portable communication device as recited in claim 13 wherein said flexible members can be furled and unfurled.

15. A hand-held personal portable communication device as recited in claim 10 wherein said first and second sets of display signals correspond to first and second different views, respectively, of display data thereby creating a three-dimensional visual representation.

16. A handheld personal portable communication device as recited in claim 10 wherein said first and second sets of display signals represent odd and even fields supplied to said first and second screens.

17. A hand-held personal portable communication device as recited in claim 10 wherein said display system is detachable from said housing.

18. A hand-held personal portable communication device as recited in claim 17 wherein said display signals are provided to said display system in a wireless manner.

\* \* \* \* \*